United States Patent [19]

Kataoka et al.

[11] Patent Number: 5,188,306
[45] Date of Patent: Feb. 23, 1993

[54] SELF-ADVANCING FILM CASSETTE INCLUDING AN AUXILIARY ROTATION TRANSMITTANCE STRUCTURE

[75] Inventors: Hideaki Kataoka; Kazuo Okutsu; Koichi Takahashi; Kazunori Mizuno, all of Kanagawa, Japan

[73] Assignee: Fuji Photo Film Co., Ltd., Kanagawa, Japan

[21] Appl. No.: 618,554

[22] Filed: Nov. 27, 1990

[30] Foreign Application Priority Data

| Nov. 27, 1989 [JP] | Japan | 1-307054 |
| Dec. 4, 1989 [JP] | Japan | 1-314547 |
| Dec. 11, 1989 [JP] | Japan | 1-320942 |

[51] Int. Cl.$^5$ ............... B65H 75/28; B65H 16/10; B65H 20/26; G03B 1/00
[52] U.S. Cl. ................................ 242/71.1; 354/275
[58] Field of Search ............. 242/74, 71.1, 71.2; 354/275

[56] References Cited

U.S. PATENT DOCUMENTS

| 2,074,968 | 3/1937 | Orr | 242/74 |
| 2,336,278 | 12/1943 | Mihalyi | 25/31 |
| 2,360,255 | 10/1944 | Mihalyi | 242/71 |
| 2,364,381 | 12/1944 | Mihalyi | 242/71 |
| 2,521,935 | 9/1950 | Monroe | 1/2 |
| 2,552,200 | 5/1951 | Mihalyi | 242/71 |
| 3,155,338 | 11/1964 | Uterhart | 242/74 |
| 3,236,474 | 2/1966 | Day | 242/74 |
| 3,318,549 | 5/1967 | Macomber | 242/74 |
| 3,400,897 | 9/1968 | Guernet | 242/74 |
| 3,467,340 | 9/1969 | Rosenburgh | 242/197 |
| 3,556,435 | 1/1971 | Wangerin | 242/210 |
| 3,627,229 | 12/1971 | Wangerin | 242/71.8 |
| 3,627,230 | 12/1971 | Wangerin | 242/71.8 |
| 3,677,499 | 7/1972 | Wangerin | 242/210 |
| 3,797,777 | 3/1974 | Hosono et al. | 242/71.8 |
| 4,285,480 | 8/1981 | Parker | 242/195 |
| 4,291,966 | 9/1981 | Bendoni et al. | 354/275 |
| 4,832,275 | 5/1989 | Robertson | 242/71.1 |
| 4,834,306 | 5/1989 | Robertson et al. | 242/71.1 |
| 4,846,418 | 7/1989 | Fairman | 242/71.1 |
| 4,848,693 | 7/1989 | Robertson | 242/71.1 |
| 4,962,401 | 10/1990 | Takahashi | 242/71.1 |
| 4,986,486 | 1/1991 | Kemp | 242/74 |
| 5,003,334 | 3/1991 | Pagano et al. | 354/275 |
| 5,065,953 | 11/1991 | Schmid et al. | 242/74 |

FOREIGN PATENT DOCUMENTS

| 1522260 | 8/1969 | Fed. Rep. of Germany | 242/74 |
| 2921379 | 11/1980 | Fed. Rep. of Germany | |
| 2359061 | 2/1978 | France | |
| 2500178 | 8/1982 | France | |
| 53-13918 | 2/1978 | Japan | |
| 62-164343 | 10/1987 | Japan | |
| 503557 | 4/1939 | United Kingdom | |
| 881251 | 11/1961 | United Kingdom | |

*Primary Examiner*—Daniel P. Stodola
*Assistant Examiner*—John Q. Nguyen
*Attorney, Agent, or Firm*—Sughrue, Mion, Zinn, Macpeak & Seas

[57] ABSTRACT

A self-advancing film cassette is provided with an auxiliary rotation transmittance structure for reliably transmitting rotation of a spool to the inner turns of a roll of film in order to prevent reverse rotation of the film caused by loosening of the inner turns of the roll of film or inferior bending rigidity. According to one preferred embodiment, a step portion for pushing the bending line of a film trailer is formed on a slit, permitting the end of the film trailer to be inserted therein. In another preferred embodiment, a spool is provided with a resilient member or flap member for urging the inner turns of the roll of film toward its outer turns. The film trailer has increased bending rigidity by having an embossing treatment, applied thereto, or by attaching a skirt thereto.

2 Claims, 6 Drawing Sheets

SELF-ADVANCING FILM CASSETTE INCLUDING AN AUXILIARY ROTATION TRANSMITTANCE STRUCTURE

BACKGROUND OF THE INVENTION

This invention relates to a self-advancing film cassette for advancing the leader of a photographic film strip through a film passage mouth of the cassette in accordance with rotation of a spool.

Presently, a photographic film cassette containing a roll of photographic film strip of 135 type (35 mm in width) is most widely used. This photographic film cassette is constituted by a light tight cylindrical cassette housing provided with a film passage mouth, a spool rotatably contained in the cassette housing, and a roll of film coiled on the spool. The leader of the film protrudes outside through the film passage mouth. When loading the film cassette in a camera, the film leader is brought into engagement with a threading member of the camera. By driving the threading member, the film is pulled out from the cassette housing and is fed to a film take-up chamber so as to be wound on a take-up spool in this chamber.

In recent years, in order to make the photographic film cassette compact and easy to handle, a self-advancing film cassette has been proposed in which the entire film is contained in the cassette housing, and the film leader is advanced from the film passage mouth in accordance with rotation of the spool. In order to advance the film leader reliably, it is necessary for this kind of film cassette to rotate the spool integrally with the roll of film, thereby to transmit the rotation of the spool to the film leader reliably. For example, in Japanese Patent Laid-open Publication No. Sho 53-13918, a self-advancing film cassette is described, in which both sides of a film trailer and a spool shaft are provided with teeth. By meshing with these teeth, the spool and the roll of film are rotated integrally. On the other hand, in Japanese Utility Model Laid-open Publication No. Sho 62-164343, another self-advancing film cassette is described, in which a spool is provided on its outer surface with a substance having a shock absorbing property and resilience in order to increase friction between the spool and the film.

If the roll of film is partially loosened, a part of the film is reversed and is bent in a generally U-shape. In U.S. Pat. No. 4,832,275, a self-advancing film cassette is described, in which a pair of rings are disposed around both ends of a roll of film wound on a spool. Further, in U.S. Pat. No(s). 4,834,306 and 4,848,693 a self-advancing film cassette is described, in which a rim is provided on flanges of a spool in order to press both sides of the outermost turn of a roll of film with the rim. In U.S. Pat. No. 4,846,418, a construction is described in which a spool is formed of a pair of spool halves which are slidable in an axial direction, and both sides of a roll of film are clamped by the pair of spool halves.

However, when both sides of the film trailer and the spool shaft are provided with teeth there arises a problem in that the configurations of the film and the spool become complicated, and manufacturing costs become high. Although all the other self-advancing film cassettes mentioned above have such an advantage that the loosening of the peripheral portion of the roll of film can be prevented, a space is likely to be formed in the vicinity of a shaft of the spool because of loosening of the roll of film. If this space is formed, the film is likely to be reversed in a U-shape when the spool rotates in the unwinding direction. This causes the film to jam and makes it impossible to advance the film leader.

SUMMARY OF THE INVENTION

Therefore, it is an object of the present invention to provide a self-advancing film cassette in which rotation of a spool is transmitted to a film leader reliably.

Another object of the invention is to provide a self-advancing film cassette which is simple in construction and yet is able to prevent reverse rotation of the film.

To achieve the above and other objects, the present invention includes an auxiliary rotation transmittance structure for transmitting force of rotation of a spool to the innermost turn of a roll of film when the spool rotates in the unwinding direction. In a preferred embodiment, proper treatment is applied to a film trailer so that the film trailer will not be reversed when the film advances. The auxiliary rotation transmittance structure, formed on the outer periphery of the spool, is constituted by a step portion extending in the axial direction, and a slit formed in the step portion and adapted to permit a trailer end of the bent film to be inserted therein, the bent portion of the film being pushed by the step portion when the spool rotates in the unwinding direction.

In another embodiment of the present invention, an auxiliary rotation transmittance structure is mounted on a spool and is adapted to urge the inner turns of a roll of film toward the outer turns. This auxiliary rotation transmittance structure includes a flap member which is swung to urge the innermost turn of the roll of film toward the outermost turn when the spool rotates in the unwinding direction. In still another embodiment, the auxiliary rotation transmittance structure is formed of a coiled resilient member, disposed in the inner side of the innermost turn of a roll of film, and adapted to urge the innermost turn of the roll of film toward the outermost turn of the roll of film. The resilient member may be disposed between the innermost and second innermost turns in such a manner as to cover up the innermost turn.

Since the inventive auxiliary rotation transmittance structure urges the innermost turn of the roll of film toward the outermost turn of the roll of film, or pushes the film trailer or increases the bending rigidity of the film trailer, reverse rotation of the roll of film can be prevented at its inner turns. As a result, force of rotation of the spool can be transmitted reliably to the film leader.

BRIEF DESCRIPTION OF THE DRAWINGS

The above objects and advantages will be readily understood by those skilled in the art from the detailed description of the invention with reference to the accompanying drawings, wherein.

DETAILED DESCRIPTION OF THE PREFERRED EMBODIMENTS

Figure 1:
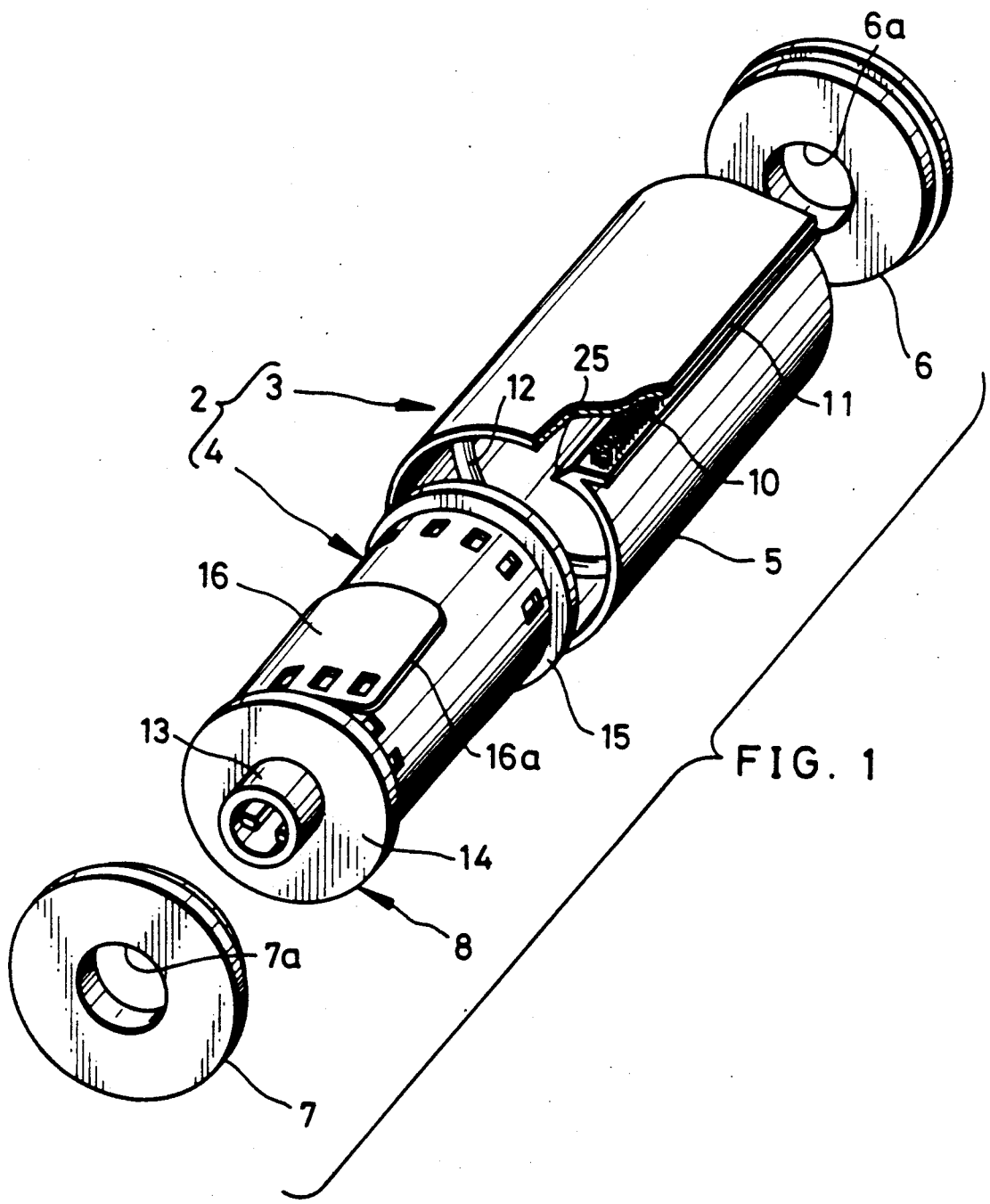
FIG. 1 is an exploded perspective view illustrating a self-advancing film cassette of the present invention.

In FIG. 1, the self-advancing film cassette 2 is constituted by a roll of film 4 and a cassette 3 for containing the roll of film 4 in light tight manner. The cassette 3 in turn is constituted by a cylindrical cassette housing 5, a pair of end caps 6 and 7 engageable with the cassette housing 5 in a light tight manner, and a spool 8. These component members preferably are formed of plastics. The cassette housing 5 is provided with a film passage mouth 11 extending in the axial direction thereof. In order to prevent light from entering the cassette housing 5 through the film passage mouth 11, the film passage mouth 11 is provided with a plush, having a light trapping function, attached thereto. The cassette housing 5 is provided on its inner wall, in the vicinity of both ends thereof, with a pair of annular ridges 12 for contacting the outermost turn of the roll of film 4 in order to prevent the roll of film 4 from being loosened and to reduce friction with the film.

Figure 2:
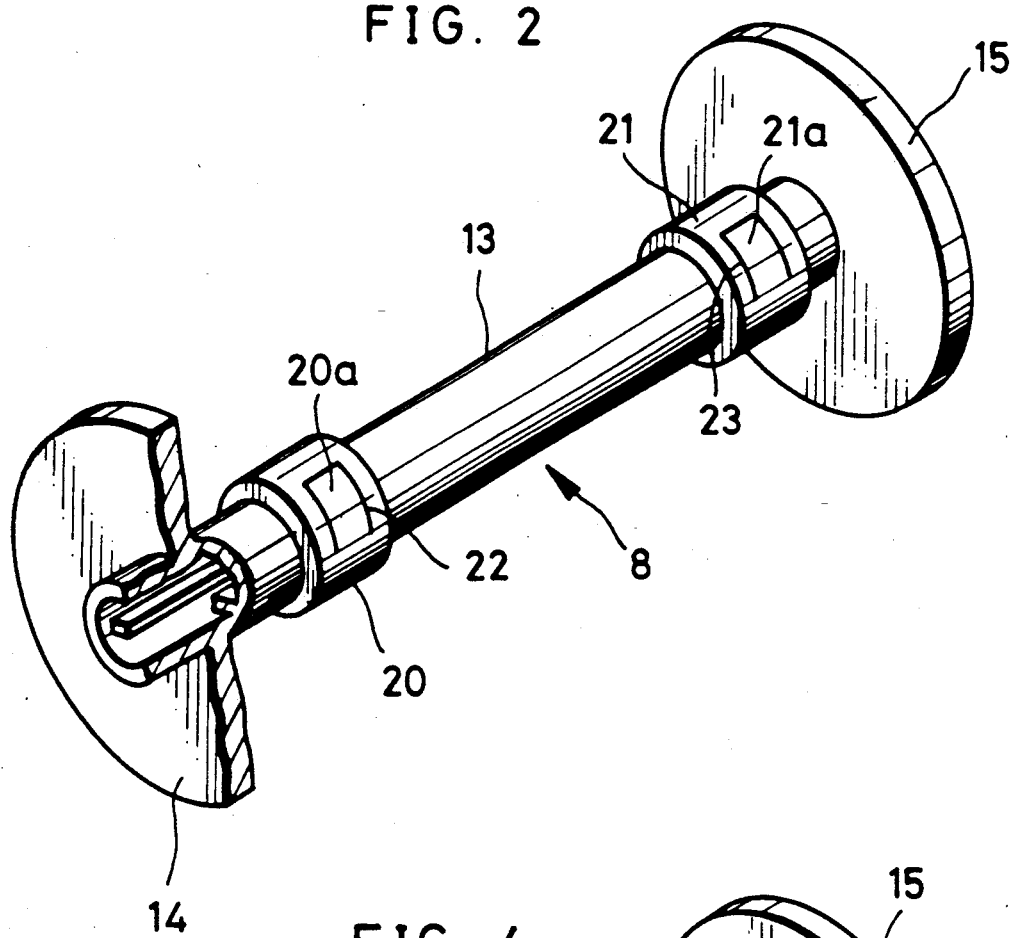
FIG. 2 is a perspective view partly cutaway, illustrating a spool illustrated in FIG. 1.

The roll of film 4 is constituted by a 135 type film (35 mm in width) wound on the spool 8 with its back surface facing outwardly. Before or after the roll of film 4 is loaded in a camera (not shown), a film leader 16 is drawn in the cassette housing 5. The pair of end caps 6 and 7 are provided with openings 6a and 7a for rotatably holding a spool shaft 13 of the spool 8. One of the end caps 6a and 7a may be integrated with the cassette housing 5. Furthermore, it may be designed such that the end caps are attached to the cassette housing 5, and such that in the foregoing state, the cassette housing 5 integrated with the end caps is divided into two equal halves, each cassette half being molded integrally from plastic material In FIG. 2, the spool 8 is constituted by the spool shaft 13 and a pair of flanges 14 and 15. The spool shaft 13 has a slit formed thereon. An end 17a of a film trailer 17 is inserted into the slit so as not to escape therefrom. The trailer end 17a may be secured in the slit by an adhesive agent. A pair of rings 20 and 21, constituting the auxiliary rotation transmittance structure are supported rotatably on the spool shaft 13. As shown in FIG. 2, these rings 20 and 21 include flap portions 20a and 21a defined by channel-like cuts 22 and 23 formed in a part of the corresponding rings 20 and 21. The flap portions 20a and 21a are swung by a projection 13a (FIGS. 3A and 3B) formed on the spool shaft 13 when the spool 8 rotates in the unwinding direction. The rings 20 and 21 are provided with means for enlarging the coefficient of friction such as, for example, minute rough spots formed on the peripheral surfaces of the rings 20 and 21, so that the film will not slip. Flap members, formed separately from the rings 20 and 21, may be attached swingably to the rings 20 and 21. In an actual construction, each of the rings 20 and 21 consists of two ring halves, which are mounted first on the spool shaft 13, and then are integrated by adhering or fitting them to each other.

Figure 3A:
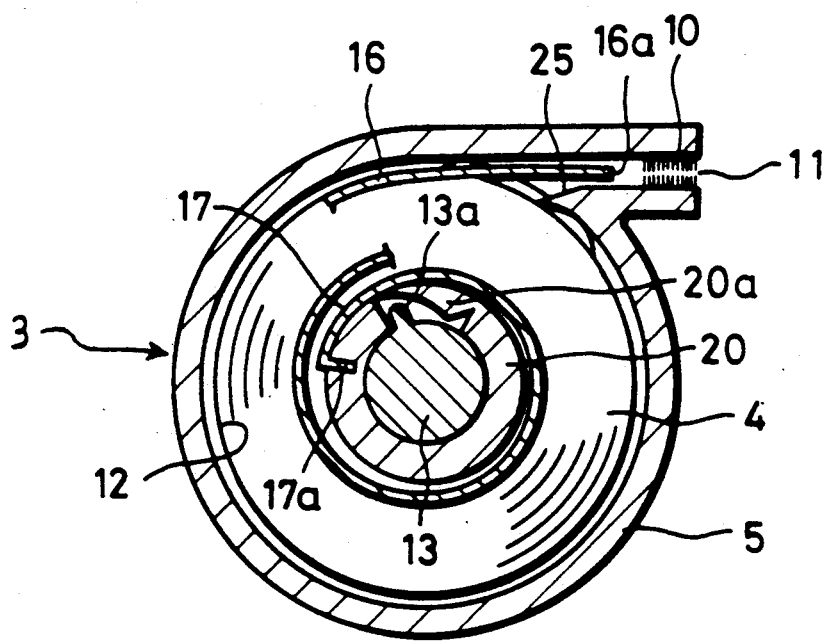
FIG. 3A is a sectional view illustrating the self-advancing film cassette in FIG. 1.
Figure 3B:
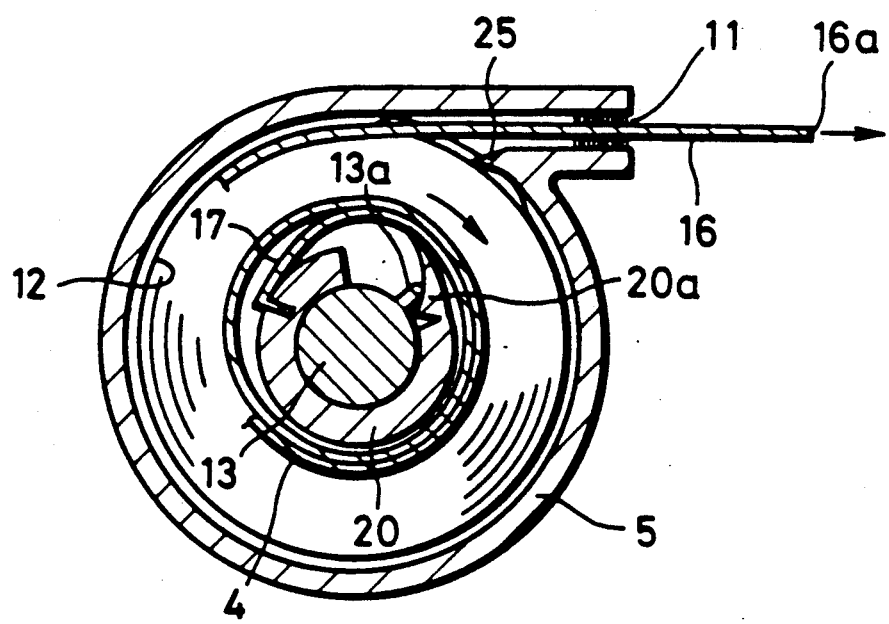
FIG. 3B is a sectional view similar to FIG. 3A, but showing a state where the film advances in accordance with rotation of the spool.

Operation of the above embodiment now will be described. The self-advancing film cassette 2, as shown in FIG. 3A has the film leader 16 fully drawn into the cassette 3. When this self-advancing film cassette 2 is loaded in a film supply chamber, a driving shaft (not shown) is coupled with the spool shaft 13. When the spool shaft 13 is rotated in the unwinding direction by the driving shaft, the projection 13a pushes the flap portions 20a and 21a outwardly. Since these flap portions 20a and 21a, as shown in FIG. 3B, are swung to urge the innermost turn of the roll of film 4 toward the outermost turn thereof, the loosening at the inner turns of the roll of film 4 can be obviated an frictional force between the turns can be increased. As a result since the force of rotation of the spool shaft 13 is transmitted reliably to the roll of film 4, the film trailer 17 is reversed to prevent occurrence of jamming, and the spool 8 is rotated integrally with the roll of film 4. While the roll of film 4 is being rotated together with the spool 8, the film leader end 16a is separated by a separation claw 25. The film leader end 16a is protruded outside through the film passage mouth 11 and advances toward the film take-up chamber.

Figure 4:
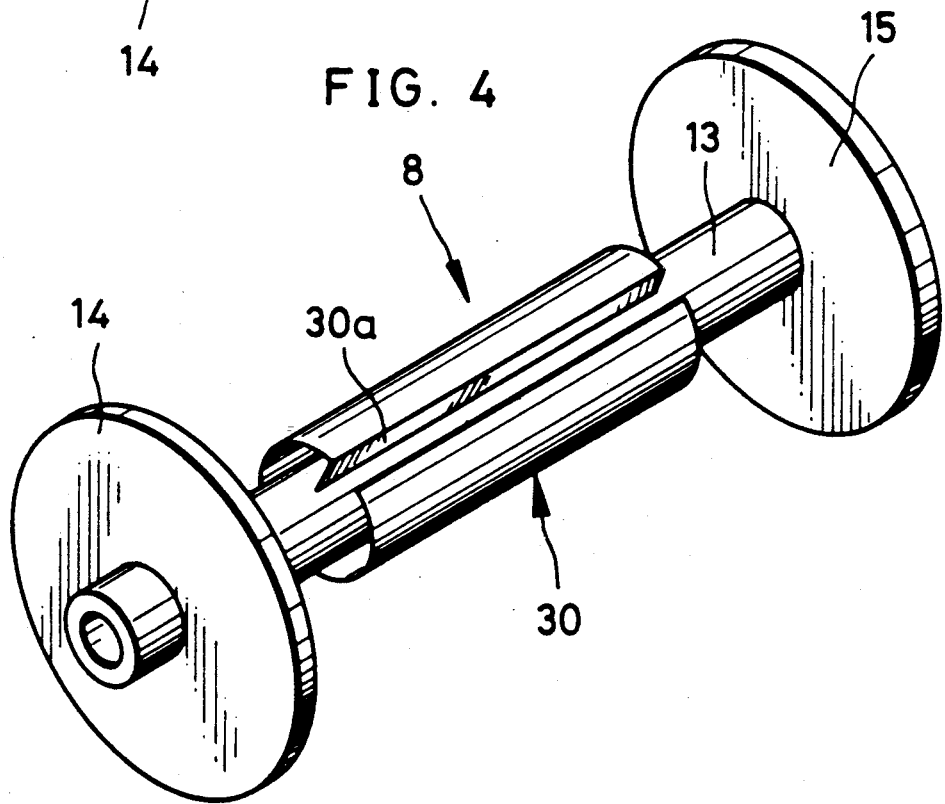
FIG. 4 is a perspective view illustrating a spool according to another embodiment of the present invention in which a spool shaft is provided with a cylindrical resilient member.
Figure 5:
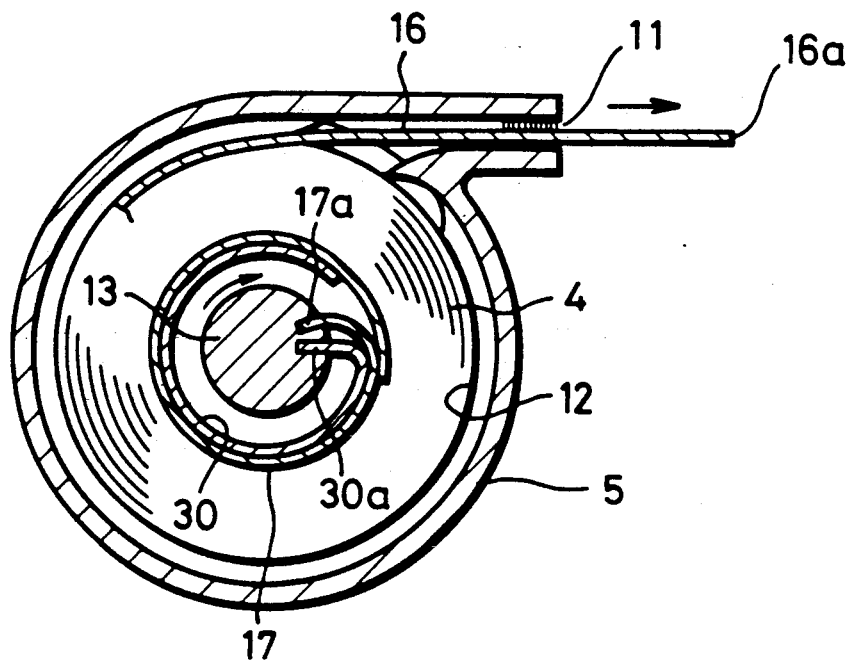
FIG. 5 is a section view illustrating a self-advancing film cassette provided with the spool in FIG. 4.

FIGS. 4 and 5 show one embodiment in which the loosening of the roll of film is prevented by a resilient member. Members similar to those of the above-mentioned embodiment are denoted by like reference numerals in this embodiment. The spool shaft 13 is provided with a substantially cylindrical resilient member 30 having a spring property for spreading outwardly. The resilient member 30 is disposed in such a manner as to cover up the spool shaft 13 with one end 30a thereof inserted into the spool shaft in a substantially perpendicular direction and fixed thereto. The resilient member 30 preferably is a thin metallic plate, but also may be molded from plastic material. A surface treatment is applied to the surface of the periphery of the resilient member 30 in order to enlarge its coefficient of friction, thereby to prevent the film from slipping.

As shown in FIG. 5, the film trailer end 17a is fixed to the spool shaft 13 at the side of a fixed end 30a of the resilient member 30. The film trailer 17 is wound on the resilient member 30 in such a manner as to enclose the fixed end 30a. In this embodiment, as the resilient member 30 pushes the innermost turn of the roll of film 4 toward the outermost turn because of its resilience the loosening of the inner turns of the roll of film 4 can be prevented. In order to prevent the take-in action caused by reverse rotation of the film, it is preferable that the film trailer end 17a and the fixed end 30a of the resilient member 30 be as close as possible.

Figure 6:
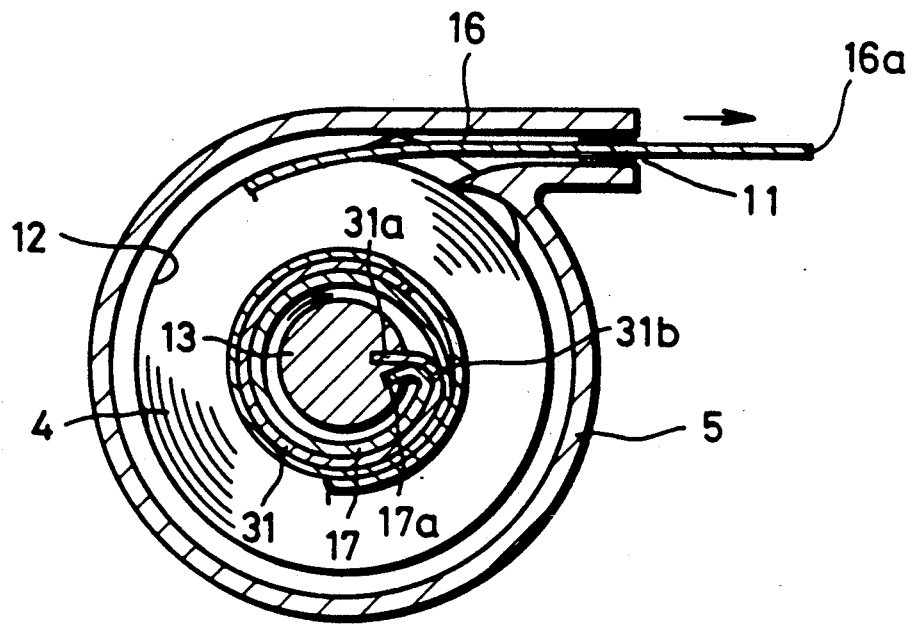
FIG. 6 is a sectional view similar to FIG. 5 but showing another embodiment in which a resilient member is disposed in such a manner as to cover up the innermost turn of a roll of film.

In the embodiment shown in FIG. 6, the fixed end 31a of the resilient member 31 is disposed at an outer side of the film trailer end 17a so as to enclose the innermost turn of the roll of film 4. When the bending portion 31b of the resilient member 31 abuts against the bending portion of the film trailer 17 to rotate the spool 8 in the unwinding direction, it pushes the bending portion of the film from the backward direction. In this embodiment, the resilient member 31 urges the roll of film 4 from its inner side to enlarge force of friction between the turns, and in addition the resilient member 31 pushes the film trailer 17. As a result, the force of rotation of the spool 8 is transmitted reliably to the roll of film 4.

Figure 7:
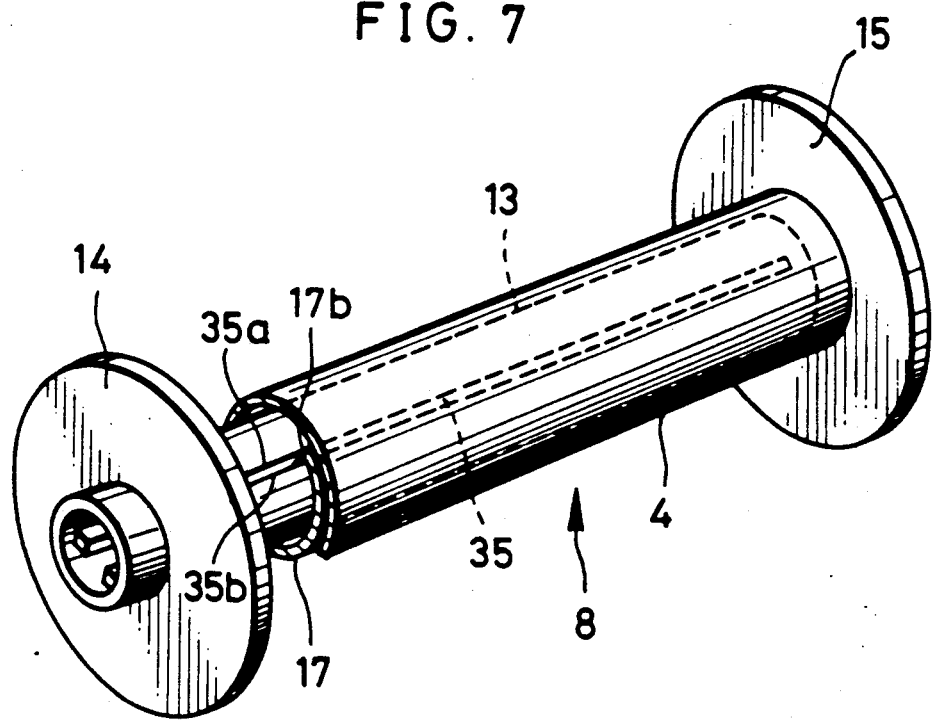
FIG. 7 is a perspective view illustrating a spool provided with a slit having a step portion on its inlet.
Figure 8:
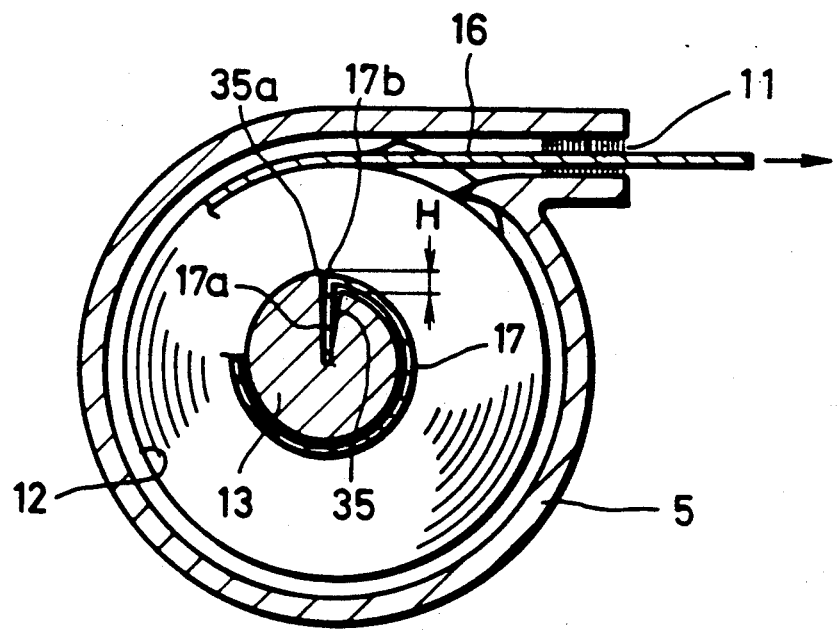
FIG. 8 is a sectional view illustrating a self-advancing film cassette provided with the spool in FIG. 7.

FIGS. 7 and 8 show an embodiment in which the bending line of the film trailer is pushed by a part of the spool shaft. In this embodiment a slit 35 is formed on the spool shaft 13 so as to extend toward the center of the spool shaft 13. The slit 35 has a wedge shape, and is narrower in a deeper position thereof. The radius at an edge 35a of one wall of the slit 35 is larger than that at an edge 35b of the other wall. Owing to the foregoing arrangement a step having a length H, larger than the thickness of the film, is formed between the edges 35a and 35b. Instead of forming the inner wall of a coil core 26 high as mentioned above, a thin plate may be inserted into the slit 35 together with the film trailer end 17a.

The film trailer end 17a is inserted into the slit 35 in such a manner as not to escape therefrom, and is bent by substantially 90° along a sharp bending line 17b so that the film trailer 17 can contact the edge 35b. The film trailer 17 may be bent naturally by rotating the spool 16 after the film trailer end 17a has been inserted into the slit 35a, but it is more preferable that the film trailer 17 be bent beforehand by heat pressing or mechanical means. Otherwise, an adhesive agent may be charged into the slit 35.

In this embodiment, when the spool 8 is rotated in the unwinding direction, the edge 35a abuts and pushes the bending line 17b of the film trailer 17. As a result, rotation of the spool 8 is reliably transmitted to the film leader end 16a. By this, the film leader end 16a can be advanced through the film passage mouth 11.

Figure 9:
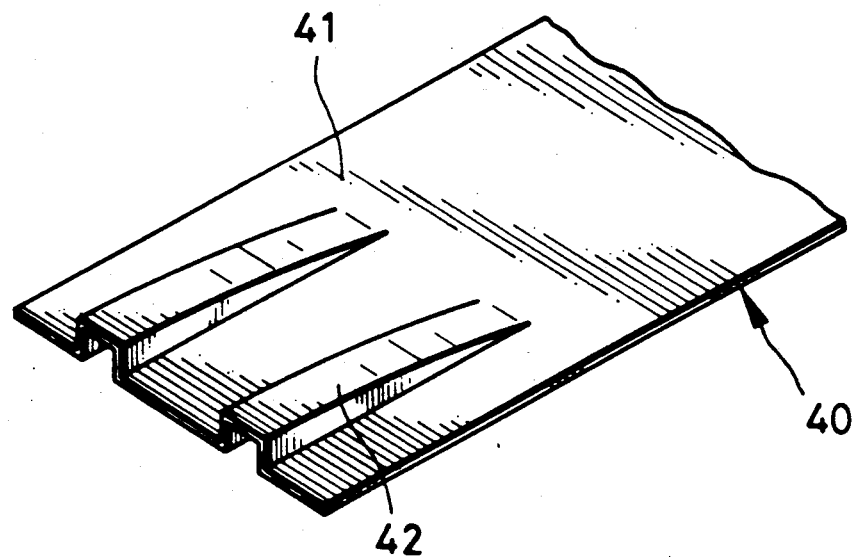
FIGS. 9 and 10 are respective perspective views showing a film trailer having an increased bending rigidity.

FIG. 9 shows another embodiment in which rotation of the spool 8 can be transmitted reliably to the roll of film 4 by applying no extra mechanical improvement to the cassette body or the spool and by increasing bending rigidity of the film trailer. That is, in a film 40 shown in FIG. 9, by forming embossing 42 on the film trailer 41 fixed to the spool shaft, the bending rigidity of the film trailer 41 is increased. With the foregoing construction, when the spool 8 is rotated in the unwinding direction, the film trailer 41 is not taken in by being bent, and rotation of the spool 8 is transmitted reliably to the roll of film 4. The embossing 42 can be formed by applying, for example, the film 40 to a heat-embossing roller under pressure.

Figure 10:
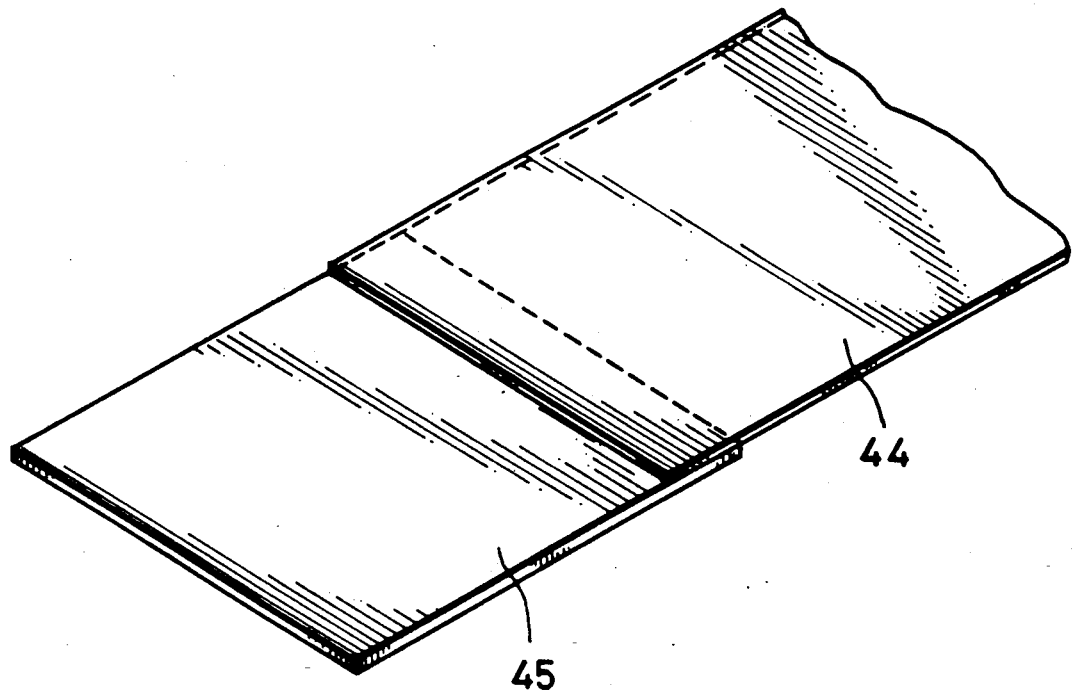

In the embodiment shown in FIG. 10, one end of a skirt 45 having a high bending rigidity is attached to the film trailer 44 and the other end of the skirt 45 is fixed to the spool shaft 13. This skirt 45 is made from material having higher rigidity than the film 40, such as polyester, polyimide, polyphenylene sulfite and polyether imide. The thickness of the skirt 45 preferably is approximately 100 to 200 microns. The embodiment shown in FIGS. 9 and 10 also may be used in combination with any of the above-mentioned embodiments.

While the invention has been described in detail above with reference to a preferred embodiment, various modifications within the scope and spirit of the invention will be apparent to people of working skill in this technological field. Thus the invention should be considered as limited only by the scope of the appended claims.

What is claimed is:

1. A self-advancing film cassette comprising:
   a cassette housing;
   a spool disposed within said cassette housing, said cassette housing including a film passage mouth, wherein a film leader on the periphery of a roll of film coiled on said spool advances through said film passage mouth when the spool is rotated in an unwinding direction; and
   auxiliary rotation transmittance means for transmitting the force of rotation of said spool to inner turns of said roll of film;
   wherein said roll of film further comprises a film trailer which is fixed to said spool;
   wherein said film trailer is bent by approximately 90 degrees in the vicinity of an end thereof along a sharp bending line extending in a width direction thereof; and
   further wherein said auxiliary rotation transmittance means includes a slit extending int he axial direction of said spool for inserting said bent film trailer end, and a step portion formed at an inlet of said slit for pushing said bent film trailer end along said sharp bending line when said spool is rotated in the unwinding direction.

2. A self-advancing film cassette as claimed in claim 1, wherein said slit has a wedge-like cross-sectional shape, a width of which becomes narrower at a radially deeper position from said inlet.

* * * * *